US012646375B1

(12) United States Patent
Seelig et al.

(10) Patent No.: US 12,646,375 B1
(45) Date of Patent: Jun. 2, 2026

(54) METHOD AND APPARATUS FOR CUSTOMIZING GAMING MACHINES WITH SPECIFIC VISUAL, OLFACTORY, AND AUDIBLE FEATURES PROVIDING A SENSORY IMMERSION INVOKING A BRAND LIKENESS

(71) Applicants: Mac Seelig, Fort Lauderdale, FL (US); Charlie Lombardo, Henderson, NV (US); Thomas Sykes, Atlantic City, NJ (US); Diane Bowers, Coconut Creek, FL (US)

(72) Inventors: Mac Seelig, Fort Lauderdale, FL (US); Charlie Lombardo, Henderson, NV (US); Thomas Sykes, Atlantic City, NJ (US); Diane Bowers, Coconut Creek, FL (US)

( * ) Notice: Subject to any disclaimer, the term of this patent is extended or adjusted under 35 U.S.C. 154(b) by 0 days.

(21) Appl. No.: 17/542,319

(22) Filed: Dec. 3, 2021

Related U.S. Application Data

(60) Provisional application No. 63/120,973, filed on Dec. 3, 2020.

(51) Int. Cl.
*G07F 17/32* (2006.01)
*G06Q 30/02* (2023.01)
(Continued)

(52) U.S. Cl.
CPC ..... *G07F 17/3227* (2013.01); *G06Q 30/0201* (2013.01); *G06Q 30/0281* (2013.01);
(Continued)

(58) Field of Classification Search
CPC ............. G07F 17/3227; G07F 17/3206; G07F 17/3216; G07F 17/3223; G07F 17/34;
(Continued)

(56) References Cited

U.S. PATENT DOCUMENTS

| | | | |
|---|---|---|---|
| 7,247,098 B1 * | 7/2007 | Bradford | G07F 17/3202 |
| | | | 463/47 |
| 2010/0087259 A1 * | 4/2010 | Johnson | G07F 17/32 |
| | | | 463/46 |

(Continued)

OTHER PUBLICATIONS

Frank Beacham, Using a Bell Curve for Speakers, Mix Audio for the Masses, Jul. 24, 2017, The Broadcast Audio Bridge, available at <<https://www.thebroadcastbridge.com/content/entry/9042/using-a-bell-curve-for-speakers-mix-audio-for-the-masses>>. (Year: 2017).*

*Primary Examiner* — Werner G Garner
(74) *Attorney, Agent, or Firm* — White-Welker & Welker, LLC; Matthew T. Welker, Esq.

(57) ABSTRACT
Applying a specific visual, olfactory, and audio impression to a game machine which evokes the name, image, likeness, and look and feel of a company or brand's identity to the game machine, in particular slot machines. A controller device which contains a game board, sound board, and a light and lighting board. The controller device can be used in a plurality of machines to control game play but taking inputs from a user interface and connecting them to the game board input of the game board which controls the game play of the machine, and then delivering the result of the input to the machine display via the game board out. Wireless communication access to the controller device and corresponding game board, sound board, and light and lighting board and is not to be used for data collection, the wireless communication is only used for game play.

25 Claims, 9 Drawing Sheets

(51) Int. Cl.
*G06Q 30/0201* (2023.01)
*G06T 7/10* (2017.01)
*G07F 17/34* (2006.01)
*G09F 13/00* (2006.01)

(52) U.S. Cl.
CPC ............ *G06T 7/10* (2017.01); *G07F 17/3206* (2013.01); *G07F 17/3216* (2013.01); *G07F 17/3223* (2013.01); *G07F 17/34* (2013.01); *G09F 13/005* (2013.01); *G06T 2207/30201* (2013.01)

(58) Field of Classification Search
CPC ............ G06T 7/10; G06T 2207/30201; G06Q 30/0201; G06Q 30/0281; G09F 13/005
See application file for complete search history.

(56) References Cited

U.S. PATENT DOCUMENTS

| | | | |
|---|---|---|---|
| 2011/0205068 A1* | 8/2011 | Huynh | G07F 17/3227 |
| | | | 340/573.1 |
| 2015/0161843 A1* | 6/2015 | Keilwert | G07F 17/3209 |
| | | | 463/31 |
| 2017/0039798 A1* | 2/2017 | Walker | G07F 17/3244 |
| 2020/0342710 A1* | 10/2020 | Acres | G07F 17/34 |
| 2021/0110648 A1* | 4/2021 | Bucher | G07F 17/3209 |
| 2021/0192884 A1* | 6/2021 | Idris | G06N 3/084 |

* cited by examiner

200

202

203

201

300

801
802
803
804
805
805
809
810
811
812

METHOD AND APPARATUS FOR CUSTOMIZING GAMING MACHINES WITH SPECIFIC VISUAL, OLFACTORY, AND AUDIBLE FEATURES PROVIDING A SENSORY IMMERSION INVOKING A BRAND LIKENESS

FEDERALLY SPONSORED RESEARCH

Not Applicable

SEQUENCE LISTING OR PROGRAM

Not Applicable

TECHNICAL FIELD OF THE INVENTION

The present invention relates generally to game machines. More specifically, the present invention relates to an apparatus for applying a specific visual, olfactory, and audio impression providing a sensory immersion to a game machine which evokes the name, image, likeness, and look and feel of a company or brand's identity to the game machine, in particular slot machines.

BACKGROUND OF THE INVENTION

Slot machines are commonly regarded as exciting by casino goers as the thrill of pulling down a lever and having a lot of money cascade from the machine to the floor is the lore of movies and advertising. Some people think these machines are boring, as one doesn't need any skill in order to play. The Random Number Generator (RNG) is the brains of the slot machine. While most players know that there is a computer chip picking the numbers, and this is true for any RNG gaming machine, no matter the theme that is wrapped around it.

Slot machines contribute about 70 percent of the income a casino makes, but game experts are concerned about how boring it is to play the slots. Todays machines often do not provide a light show or audio acknowledgment of minor wins. In many cases, such extravagance is reserved only for large wins or jackpots, which is insufficient to attract new players to one of the most profitable areas of the gaming floor, leaving behind only those players who are repetitively and mechanically, mindlessly feeding the machine and pulling the leaver or pushing the more ever present button to initiate a play.

Increasingly, new slot machines are coming out quicker than ever and "old" ones are disappearing and being decommissioned, but increased machine turnover is expensive for casinos and chasing ever changing new machines in a constant upgrade or replacement race to have differentiating machines from other competitors does not create brand loyalty or lasting impressions on new or potential customers/players, especially millennials.

Many of these new machines are exactly the same with respect to game play, but just have different themes, which are often non-exclusive to casinos. Also, creating the non-stop churn of new machines is the feeling many players get after seeing the same light show and audio tracks over and over. Technology and new game themes build game brand loyalty not casino brand loyalty. Furthermore, technology and game themes do not provide for the changing or adjustment of the total visual, audio, and olfactory sensory experience or play experience in a manner that invokes a casino brand likeness.

Additionally, casinos are also trying to attract a younger crowd, and one obstacle may be slot machines. All casinos have the same games and brands throughout the entire industry, simply changing the themes has not resulted in increased gameplay or retention. If a machine has success in one casino, others quickly adapt and add the machine making any advantage short-lived. So while casinos are trying to replace the slots or possibly look to reduce their number, what may be needed to keep slots a viable option and to attract a new generation of not general themed machines, but machines developed for and with specific ability to create a theme directed to the specific brand of the location.

Developing themes for game machines is time consuming and expensive, typically also including expensive investment in development and labor for the hardware and software components to build the machines. Therefore what is needed is an apparatus that can be reused in multiple machines and programmed specifically for a plurality of machine designs and appearance, while enabling the delivery of a custom visual, light, and sound show with the addition of an olfactory experience, which evokes the name, image, likeness, and look and feel of a company or brand's identity to the game machine, in particular slot machines.

The apparatus needed enables the pushing or delivery of marketing content for to a player that represents the casino or location providing the game machines for play and not the games machines themselves or the game machine manufacturer.

Branded slot machines are well known in the prior art, but what is needed is a simple apparatus which can be applied to a plurality of slot machines, to provide them with a easily programmable and changing light and should show and/or theme that correlates not to a game machine theme, but to the locations identity, logo(s), and specific brand and/or location.

SUMMARY OF THE INVENTION

The present invention is a method and apparatus for applying a specific visual, olfactory, and audio impression to a game machine which evokes the name, image, likeness, and look and feel of a company or brand's identity and/or location to the game machine, in particular slot machines. The apparatus needed enables the pushing or delivery of marketing content for to a player that represents the casino or location providing the game machines for play and not the games machines themselves or the game machine manufacturer.

One goal of the present invention is to create slot machine gaming product that enables gaming companies develop their image into a logo brand customized for their slot machines. The apparatus and method of the present invention enables the customers to memorialize unique attributes shown in their brand renderings into their machines. The game machines of the present invention will have a much more glitz and glamour in comparison to machines know in the prior art as shown in the drawings.

The intent is to control an individual guitar themed slot topper using hard wired ports plus a SAS passthrough communications monitoring port. The controller device is designed to control external lights (guitar strings plus frets), external sound, and Jackpot attract mode lights. Currently, there is no bi-directional communications to our devices other than pre-existing SAS game to SAS controller messaging.

The apparatus of the present invention is an approximate six inch wide by 4 inch high and 4 inch deep controller device which contains a game board, sound board, and a light and lighting board. The controller device can be used in a plurality of machines to control game play by taking inputs from a user interface and connecting them to the game board input of the game board which controls the game play of the machine, and then delivering the result of the input to the machine display via the game board out generating ascending musical notes. An R.F. antenna provides wireless communication access to the controller device and corresponding game board, sound board, and light and lighting board and is not to be used for data collection, the wireless communication is only used for game play i.e. color and sound, etc.

Part of the process taught and enabled by the present invention is to create sounds that are linked to the indexing of the slot machine reels. This audio component will be in the form of musical notes that in specific fashion will embellish the mnemonic sounds of the company's identity. The apparatus of the present invention will select and deliver the accompanying colors based on a Luscher type color test.

With respect to an olfactory component of the invention, the apparatus will be able to connect to and control hardware for emitting and distributing a scent or other olfactory emission into the air surrounding the machine or a play, most commonly from the game console area or from under or around the chair/seat location, or both, depending on machine design and the ability to install needed hardware to provide scent emission for an olfactory experience.

The apparatus described herein provides controlling software and hardware that connects to aromatic emission devices or hardware for controlling the timing and duration of an emission for an olfactory experience in combination with the audio and visual display.

The controller device will receive data from a main office through radio frequency enabled by the R.F. Antenna or any other wireless system and has the ability to display on the screen of the machine marketing data or any other message that an operator wishes to display to its customers, i.e. club information and member rewards, etc.

In practice, the controller device can be attached to any game machine and is designed to be adaptable to any gaming machine or device in order to control and enable the delivery of a custom visual, light, and sound show with the addition of an olfactory experience, which evokes the name, image, likeness, and look and feel of a company or brand's identity to the game machine, in particular slot machines.

In one exemplary guitar embodiment of a gaming device the controller device of the present invention is designed to control, the controller device controls: multiple light functions in the chair, music to slot base, it turns on a ceiling projector, runs strings on guitar, pushes fret pulses during jackpot and does a whole sound and light show during top award. Additionally, the controller device will send data via the R.F. Antenna to all inhouse audio visual devices that are interconnected through dedicated channels.

BRIEF DESCRIPTION OF THE DRAWINGS

The accompanying drawings, which are incorporated herein an form a part of the specification, illustrate the present invention and, together with the description, further serve to explain the principles of the invention and to enable a person skilled in the pertinent art to make and use the invention.

4

Figure 1:
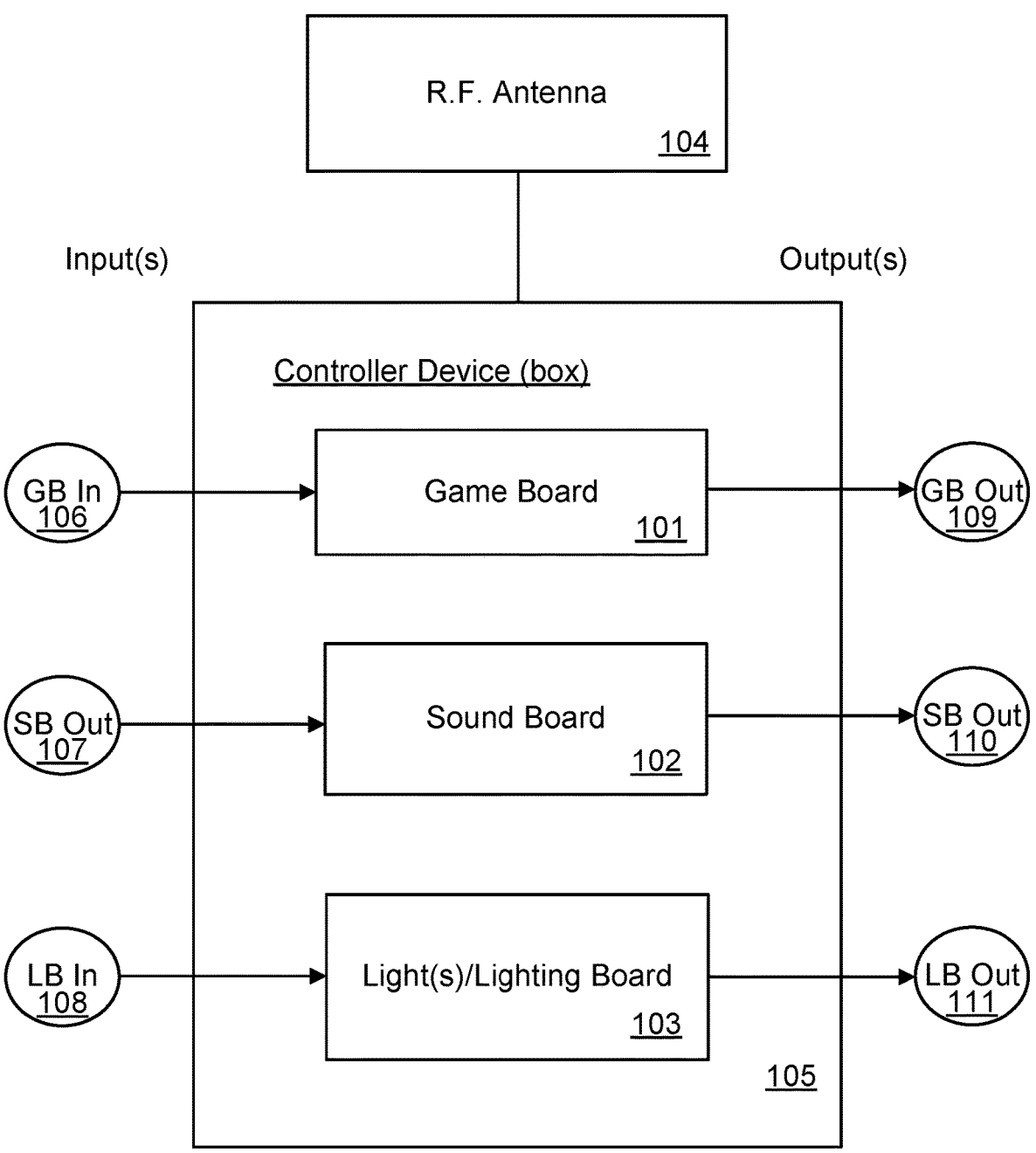

FIG. 1 illustrates a flow chart of the apparatus taught by the present invention for customizing gaming machines with specific visual and audible features invoking a brand likeness where pulses from the base game drive additional sensory effects.

Figure 2:
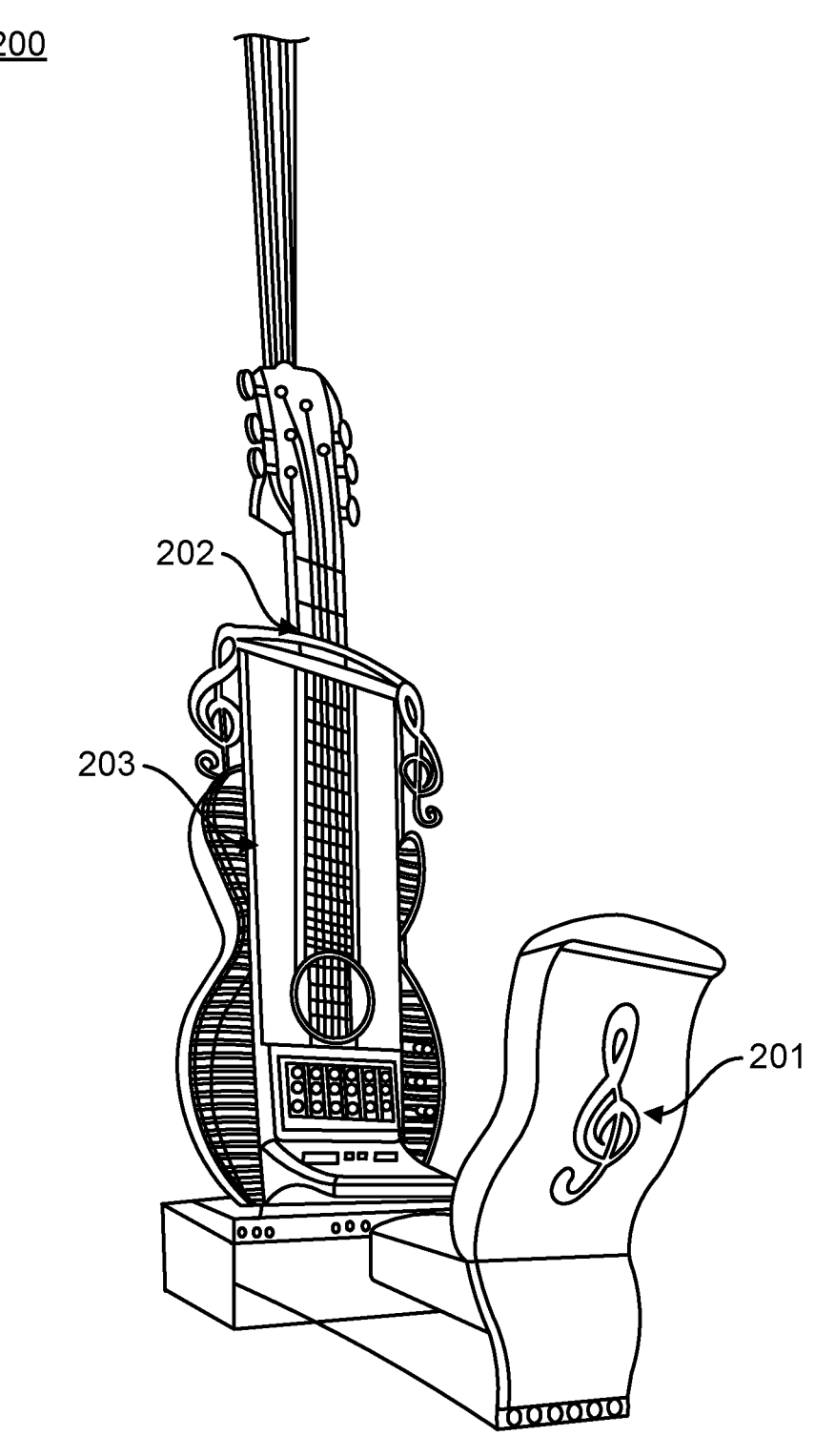

FIG. 2 is an illustration of one slot machine guitar embodiment and first player chair design taught by the present invention.

Figure 3:
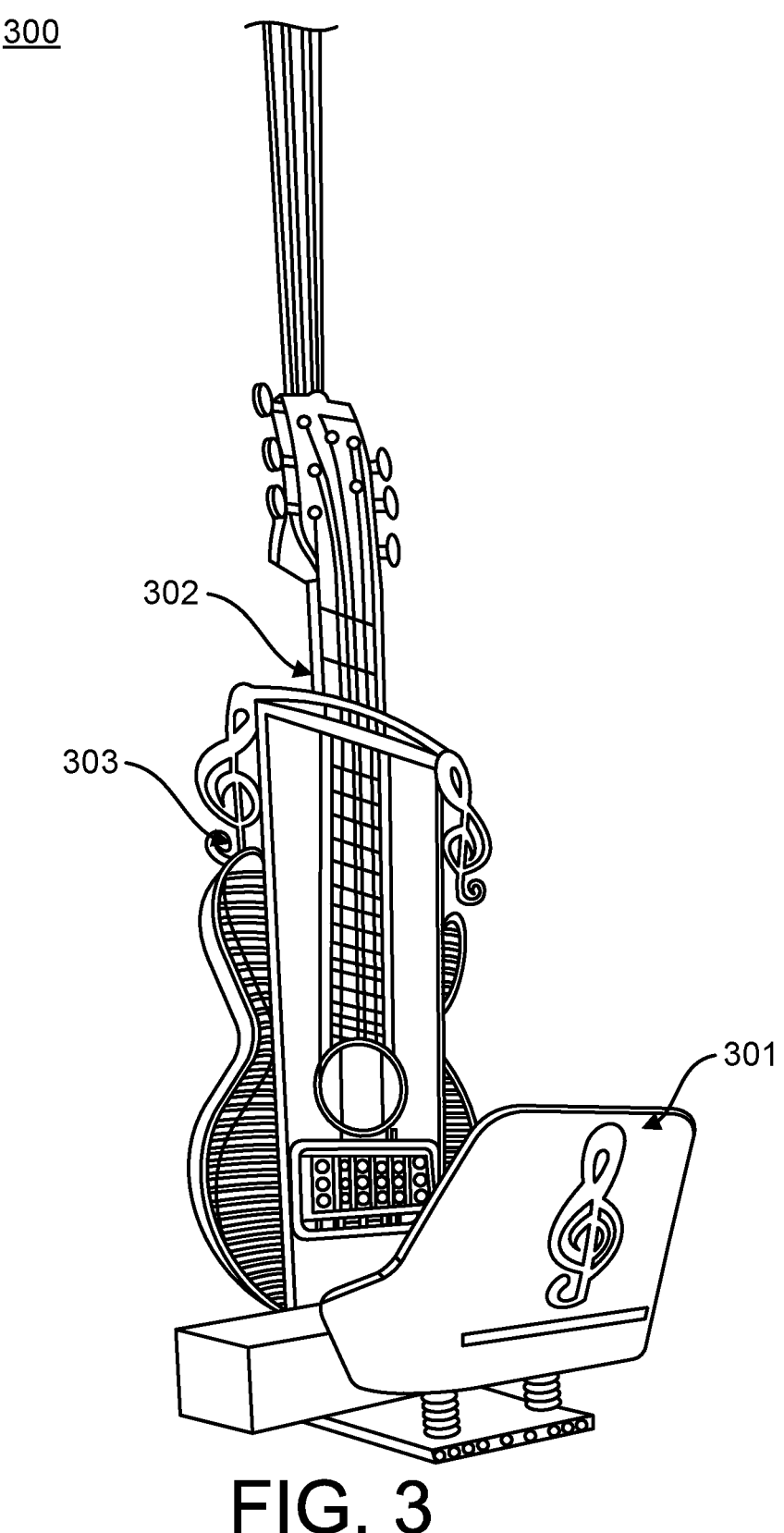
Figure 4:
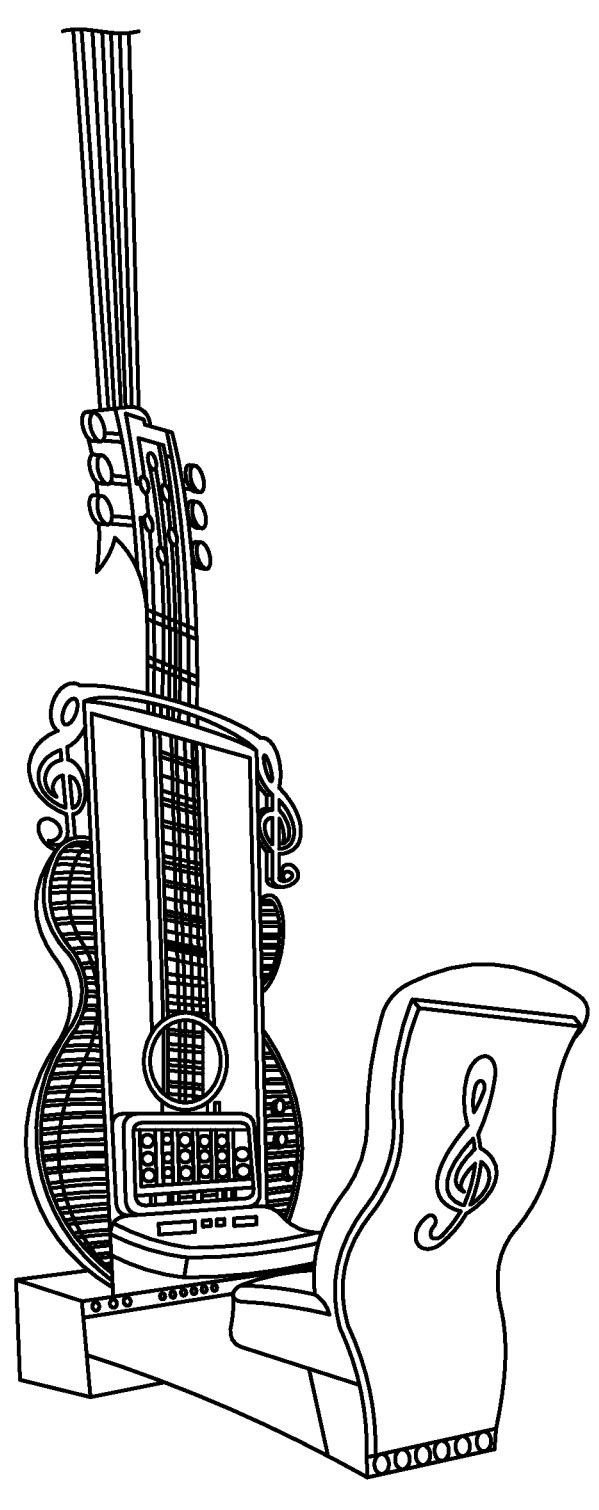
Figure 5:
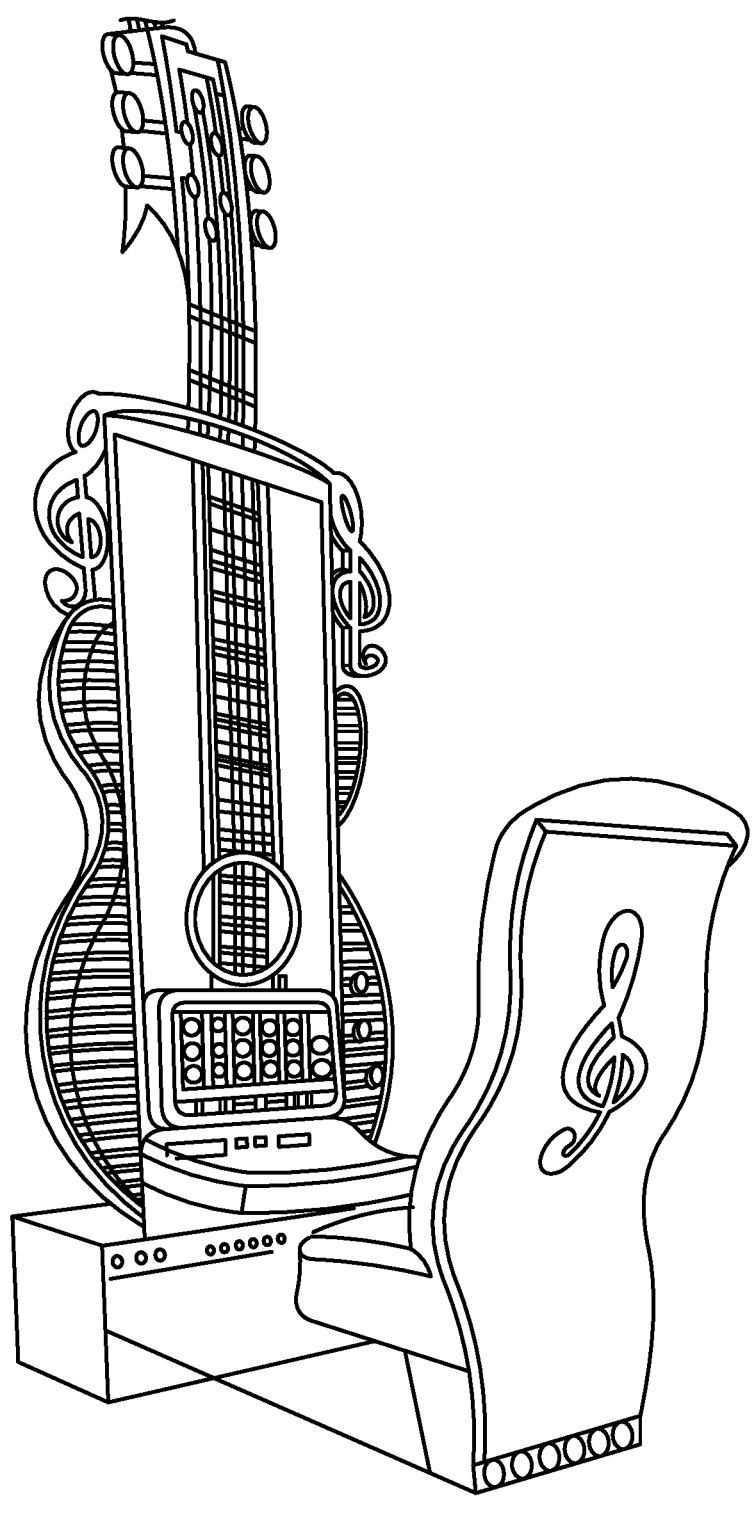
Figure 6:
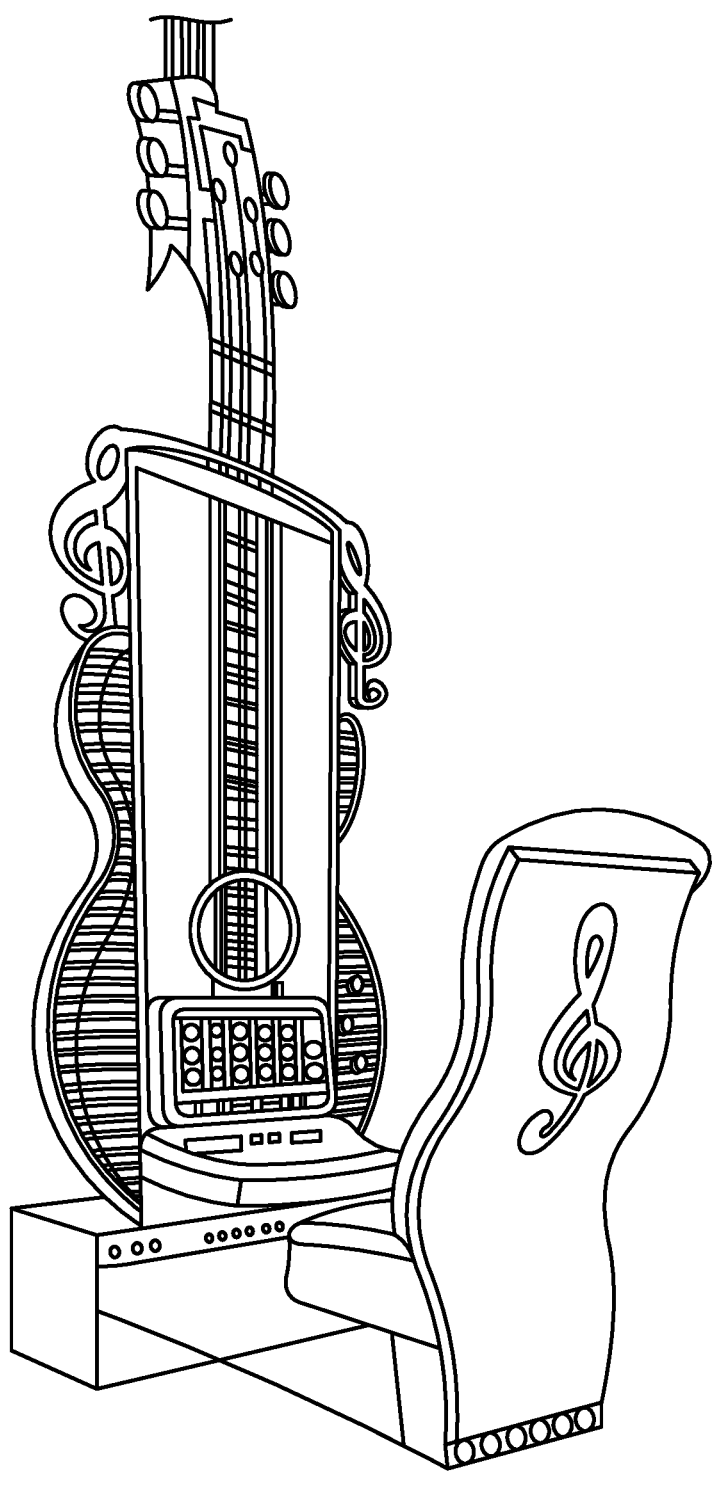
Figure 7:
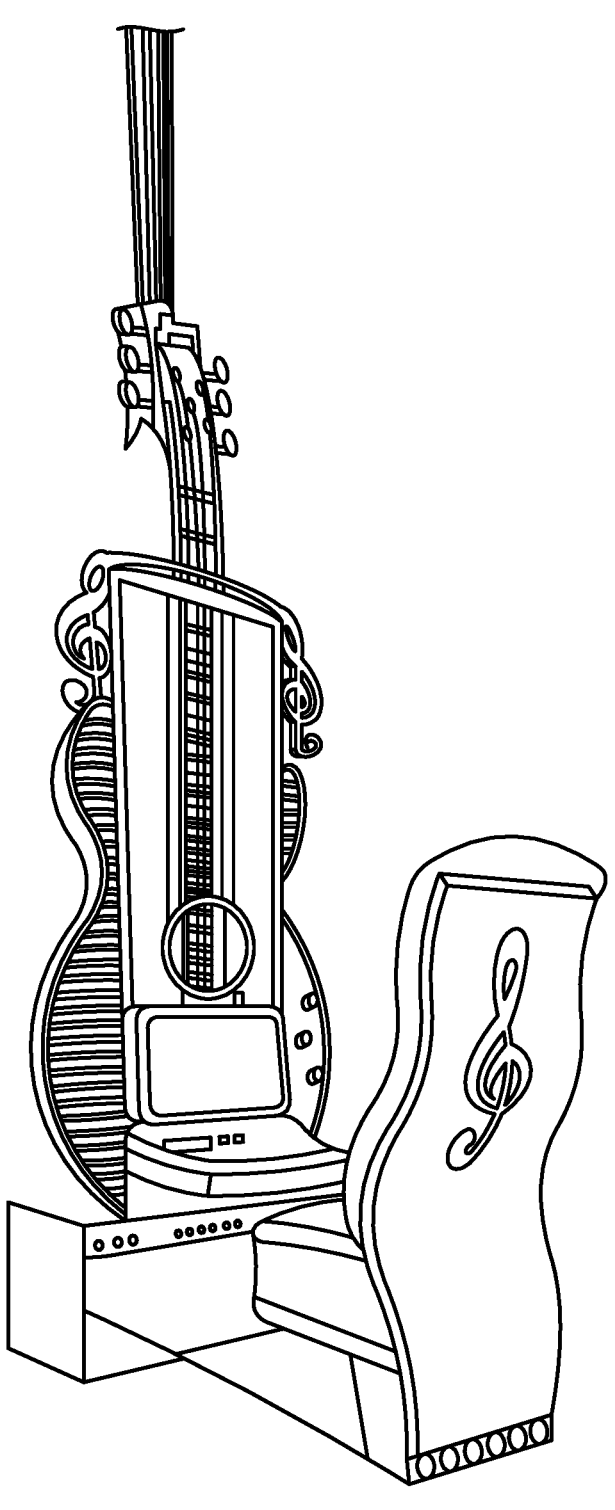

FIG. 3 is an illustration of one slot machine guitar embodiment and a second player chair design taught by the present invention.

FIGS. 4-7 illustrate the lighting control enabled by the controller device apparatus of the present invention which can control and change the entire visual color appearance of the machine, in this embodiment showing blue, red, purple, and yellow/gold.

Figure 8:
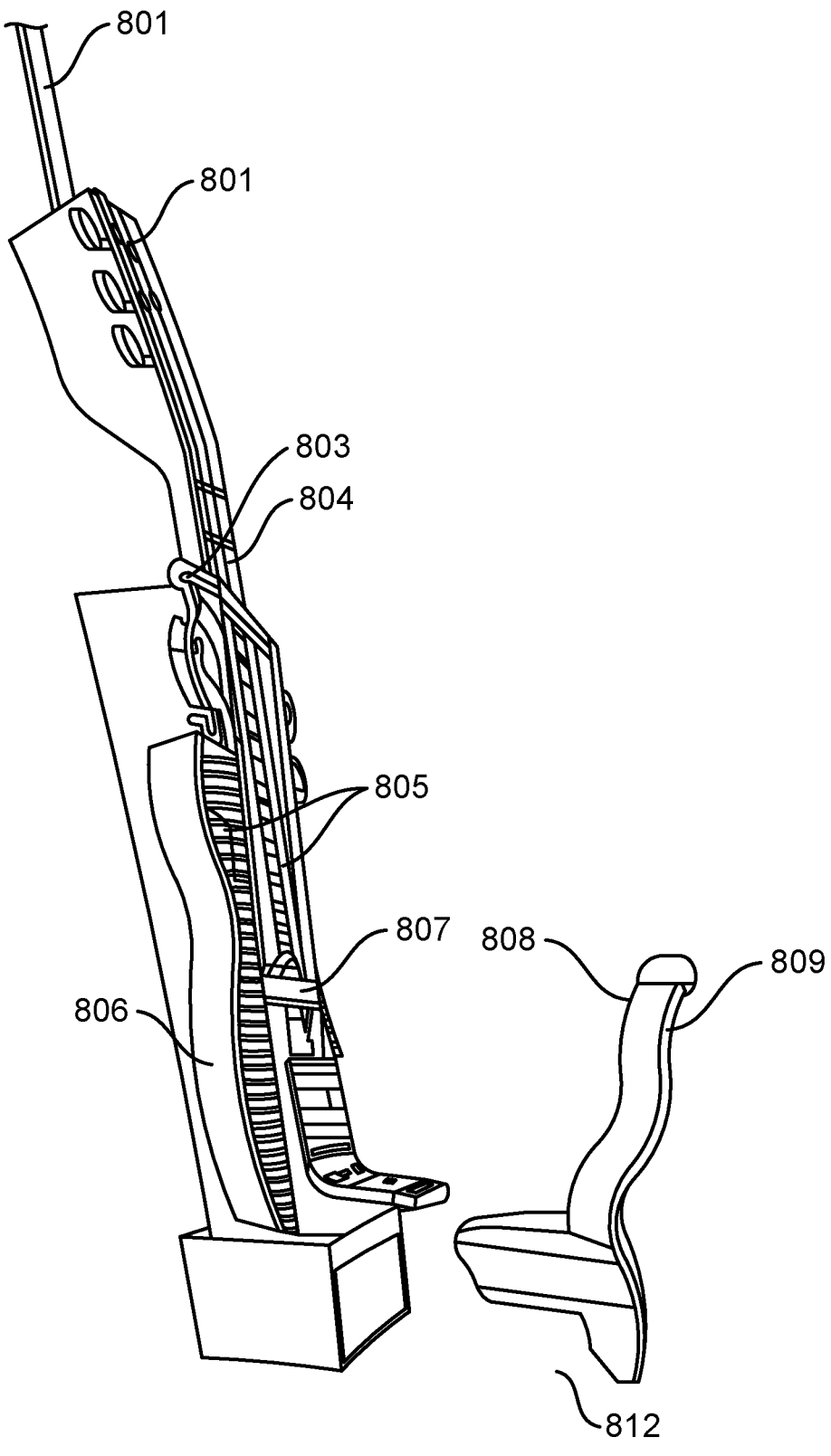
Figure 9:
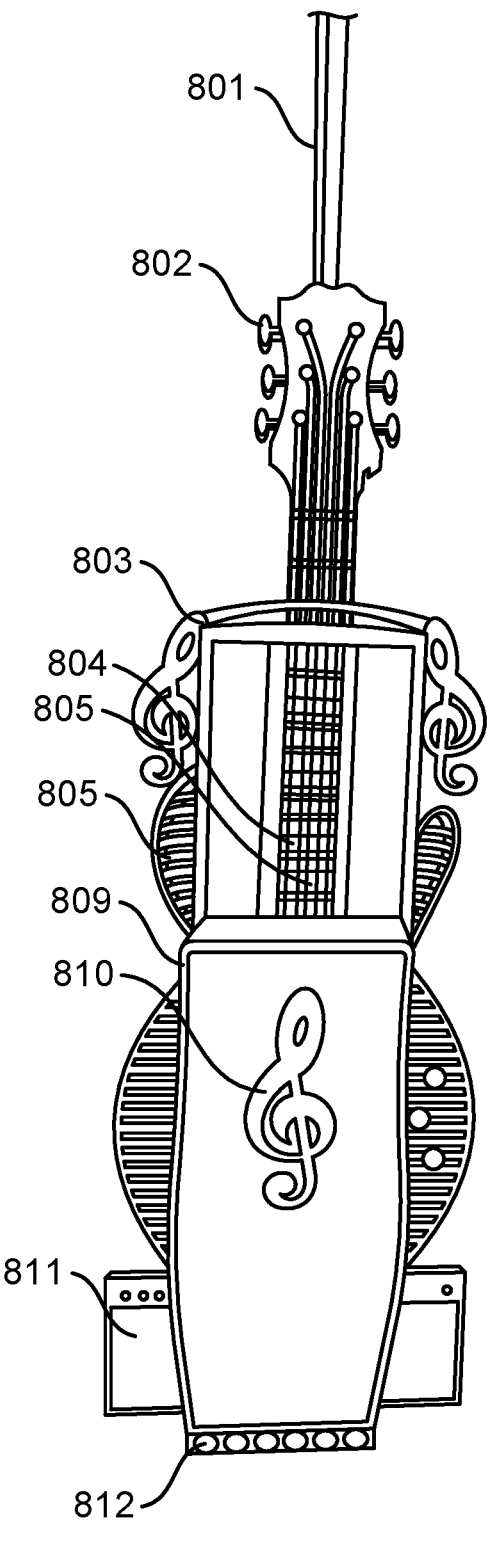

FIGS. 8-9 illustrate the key features of one exemplary machine, a guitar gaming machine, taught by the present invention.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced.

These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

Game manufacturers are developing new games at a rapid pace. Casino operators are compelled to install popular new games because their players demand new and fresh games and the casino would be at a competitive disadvantage without the new games. Game purchases and change-outs are costly to the operator/casino/host establishment. While the new games may be physically larger and have different features, the style of game play and base games are not new and are usually similar.

The casino operators are paying a premium for a game theme, not a new technology, and all these new games are building game-brand loyalty not loyalty to the house or casino operators or host locations and establishments.

The present invention relates to a method and an apparatus for applying a specific visual, olfactory, and audio impression providing a sensory immersion to a game machine which evokes the name, image, likeness, and look and feel of a company or brand's identity to the game machine, in particular slot machines.

In practice, the controller device can be attached to any game machine and is designed to be adaptable to any gaming machine or device in order to control and enable the delivery of a custom visual, light, and sound show with the addition of an olfactory experience, which evokes the name, image, likeness, and look and feel of a company or brand's identity to the game machine, in particular slot machines.

The present invention, in one exemplary embodiment, teaches a control device and software apparatus, also referred to as the controller device that will help casino operators and other establishments differentiate their slot games, reduce their compulsion to purchase expensive new games, and create house-branded games that will build loyalty to the casino operator and establishments rather than the game manufacturer and their themed game. Leased brands are expensive for a casino operator and constantly changing brands increase operating expenses without building customer loyalty to the casino.

Many game manufacturers limit the number of games or types of games, typically those which surpass given success metrics or thresholds, from being purchased from casinos and lock them into a lease only model for the most successful or well recognized machines, and new machines are typically only offered on test runs before the manufacturer decides if the machine will be a lease only model or offered for sale. This places casino and other similar operators in a bind, as they are continually paying percentages and/or royalties on leased machines which they can never own outright and which result in no loyalty from the player to the casino or operator.

Therefore, what is needed is a new machine that allows for the casino or operator to build brand loyalty with the player by offering them a machine and experience that is based on their own theme and which can not be duplicated or offered by a competitor, while also providing the same game play as other machines, which are branded or themed and available only for lease through manufacturers.

Games available in most casinos are commonly called casino games. In a casino game, the players gamble casino chips on various possible random outcomes or combinations of outcomes. Casino games are also available in online casinos, where permitted by law. Casino games can also be played outside casinos for entertainment purposes like in parties or in school competitions, some on machines that simulate gambling.

There are three general categories of casino games: table games, electronic gaming machines, and random number ticket games such as keno. Gaming machines, such as slot machines and pachinko, are usually played by one player at a time and do not require the involvement of casino employees to play. Random number games are based upon the selection of random numbers, either from a computerized random number generator or from other gaming equipment. Random number games may be played at a table, such as roulette, or through the purchase of paper tickets or cards, such as keno or bingo.

A game, as modified by the method and apparatus of the present invention will produce a unique experience for the player through various sensory stimulating effects including, visual (lighting), auditory (sounds), olfactory (aroma), and touch (vibration) that will be driven by phases of game play; the attract mode, play mode, and jackpot events.

The apparatus or controller device taught by the present invention will enable the casino operator or establishment to differentiate slot games in several areas.

The casino operator can convert any base game from any game manufacturer to a house-brand themed game. The apparatus/controller device cannot by regulation control, change, or influence the math model. The apparatus/controller device will read/input the digital pulses/signals from the base game that would drive the sounds/lighting effects during game play, suppress these native features, and produce new features that tie to the house-brand.

The apparatus/controller device will drive an immersive sensory experience during the various phases of game play; a choreographed mix of sound, light, smell, and vibration delivered from the game base, the game controller device and encasing signage elements, and a connected chair.

The immersive sensory experience is customized around the house-brand theme, is programmable, and owned by the casino. Any and all elements of the sensory experience and the timing of occurrence can be changed by the casino operator.

The casino operator can drive marketing content to the game through housing custom enclosures, video and audio channels to enhance game play, and/or cross-promote house events.

Casino operators who convert base games and create house-brand themes will build loyalty to the house-brand, significantly lower the unit cost of new games, and gain control over the game experience and uniquely, marketing messaging.

The game will be physically connected to a chair and signs. Both will have the sensory effects incorporated into their designs. A digital interface referred to as the controller device between the game, the Chair, and the Signs will drive the sensory effects in software-driven sequences, both standard and customized, that conform to the game play phases.

The casino operator will be enabled to adjust or change various sensory effects and insert brand-specific promotional elements during pre-defined phases of game play. This functionality will be server-based and encrypted Wi-Fi signals will communicate with a control device located within the custom housing of each game.

The Game, Chair, Signs, and system ("System") to control sensory effects, the control device and software, will be client and manufacturer agnostic. The inventors intend to take this concept to other casino operators and propose a unique house-brand game that includes the functionality described herein.

Any new game developed today includes software that drives two functional elements, the math model and the special effects (sounds and lights) that are triggered during the phases of game play. The game-specific math model is regulated, approved, and cannot be modified over the life of the game without regulatory review and approval. The special effects, though driven by the math model, are programmed in an independent module and are not specifically regulated.

The present invention can be adapted to and function on any game device such as slot machines, arcade machines, and any other gaming device presented for pay in a casino, arcade, or other gaming establishment.

The game recognizes game phases based on time. If the game is idle for a defined period, the attract mode effects are triggered. An attract mode is comprised of all game phases and special effects. In an attract mode, the entire repertoire of special effects or pre-programmed special effect shows or segments are displayed. In alternative embodiments, when a game machine has multiple game phases or special effects segments or programs, the attract mode can use all special effect shows or segments, any combination of selected special effect shows or segments, as well as be programmed to randomly select special effect shows or segments to create an attract mode that repeats or creates a random, continually changing attract mode comprised of all or specifically designated special effect shows and segments.

When a game session begins and the math model is functional, the random number generator operates at nano speed to generate a win or loss for each bet transaction. That outcome triggers a standard sequence of sound and lighting effects that are programmed into the base game. These effects are static and cannot be changed.

The software module within each game that receives the digital signals from the math model to trigger special effects is an independent module outside of the firewall that protects the integrity of the math model. The special effects module can be suppressed, and alternative sequences of special effects can be created and executed.

Casino operators will accept the capability and responsibility to customize special effects and marketing messages through their new house brand Game. Current branded games do not bring in incremental players. Current gaming machines are branded with their own individual themes that represent the gameplay, marketing, and artwork of the theme or licensed characters and artwork. Current gaming machines are not branded by the host company such as the casino, arcade, or other gaming establishment where a machine is located and thus has now ability to attract and develop incremental players based on the local brand of the establishment.

Now referring to FIG. 1, the apparatus of the present invention, in one exemplary embodiment is an approximate six inch wide by 4 inch high and 4 inch deep controller device 105 which contains a game board 101, sound board 102, and a light and lighting board 103 where pulses from the base game drive additional sensory effects.

The controller device is fitted into the machine, machine base, server room, IDF closet or any other secure area preferred by the casino operator. Input wires or other means of communication lead to existing machine door wiring looms where they are spliced into the current machine wiring harness.

A SAS communications interface is placed between the gaming device and SAS controller to monitor communications between the gaming machine and the SAS controller. For regulator purposes it is very important to note and understand that there is no direct communication messaging between the device of the present invention and the SAS system.

The device of the present invention monitors the SAS channel looking for Game Play messages (start new game), Jackpot messages, and Reel Spin messages (if the device supports and is configured to send Reel Spin event messages.) When a targeted message is seen by the device taught by the present invention a pre-configured attract option is enabled illuminating the guitar strings, frets, external sound properties or other attract features.

The play of the actual device is not impacted in any way by the addition of a topper and controller board as taught by the present invention. All the present invention does is add a themed attraction to the existing gaming device. All attract lighting and sounds are pre-configured in the controller device and no user interface is needed or provided.

Future enhancements may allow for the operator to select a color or sound package unique to individual machines.

Further future enhancements may also see the devices linked so a particular bank or section of gaming devices act in sync with each other when displaying attract themes.

The controller device 105 can be used in a plurality of machines to control game play but taking inputs from a user interface and connecting them to the game board input 106 of the game board 101 which controls the game play of the machine, and then delivering the result of the input to the machine display via the game board out 109. An R.F. antenna 104 provides wireless communication access to the controller device 105 and corresponding game board 101, sound board 102, and light and lighting board 103. It should also be noted that while the current embodiment of the machines utilizes RF communication, other standard wireless communications such as BLUETOOTH or NFC (near field communications) can be used to provide connectivity and control over a WAN (wide area network) or LAN (local area network).

In practice, the controller device can be attached to any game machine and is designed to be adaptable to any gaming machine or device in order to control and enable the delivery of a custom visual, light, and sound show with the addition of an olfactory experience, which evokes the name, image, likeness, and look and feel of a company or brand's identity to the game machine, in particular slot machines.

The intent is to control an individual guitar themed slot topper using hard wired ports plus a SAS passthrough communications monitoring port. The controller device 105 is designed to control external lights (guitar strings plus frets), external sound, and Jackpot attract mode lights. Currently, there is no bi-directional communications to our devices other than pre-existing SAS game to SAS controller messaging.

SAS stands for the Statistical Analysis System, a software system for data analysis and report writing. SAS is a group of computer programs that work together to store data values and retrieve them, modify data, compute simple and complex statistical analyses, and create reports.

Due to regulatory limitations, nothing in either the controller or the topper itself can impact actual game play and no messages or other SAS related communications is impacted by the addition of the device taught by the present invention. No in game attract modes or individual game behaviors are modified by the device taught by the present invention.

The device taught by the present invention does not contain any game logic, random number generators, SAS communication protocols or other, regulated and controlled game functions.

There are no EPROMS, game code, communications protocol code or other regulated device functions controlled by the device taught by the present invention. The individual gaming device using the device taught by the present invention works identically to a gaming device absent any of our hardware and or software of the device taught by the present invention.

As illustrated by one exemplary embodiment, a guitar shaped slot machine, the controller device 105 will send signals to a varied group of devices that are synchronized to visual and acoustic devices including the: chair, slot base, enclosure of slot machine, guitar strings, frets, tuning devices, and a projector hidden in neck of guitar via the sound board out 110 and lighting board out 111.

Synchronization of the lighting and the reel symbols with all of the other lighting features as winning combinations occur by having the symbols the same colors as the external colors as displayed on all the components. Thus, coordination of the reel symbols with the light show is specifically taught by the present invention which is novel and non-obvious in the prior art and with current gaming machines and attractions.

The chair base and the enclosure of the slot machine are also comprised of one or more fans and scents that can be released and circulated around the location of the player through the air creating an aromatic feature that can be smelled by the player. This aromatic feature in combination with the audio and visual controls and presentation combine to deliver a complete sensory immersion to the player.

FIGS. 4-7 illustrate the lighting control enabled by the controller device apparatus of the present invention which can control and change the entire visual color appearance of the machine, in this embodiment showing blue, red, purple, and yellow/gold. In this illustrative embodiment, the lighting colors are synchronized to the musical beat and player interaction.

Part of the process taught and enabled by the present invention is to create sounds that are linked to the indexing of the slot machine reels. This audio component will be in the form of musical notes that in specific fashion will embellish the mnemonic sounds of the company's identity. In this embodiment, the game machine has a brand specific identifier sound, which can be delivered or presented to players or potential players either explicitly or subliminally. Here, the game specific mnemonics is not used to identify the manufacturer or theme of the game machine. The mnemonic is used to identify the host or location of the game machine, more specifically that casino, arcade, or physical location and brand of the game machine host.

In alternative embodiments, one or more mnemonics can be used in combination to identify not only the host or location of the game machine, but the manufacturer of the machine, and/or the brand specific sound identifier of the theme of the machine. Here, the host or casino/arcade may have their own sound identifier, the machine manufacturer may have their own sound identifier, and the game machine's them may have its own sound identifier. One or more of these sound identifiers may be used in combination or alone to identify the corresponding party to a player or potential player.

With respect to the sound identifier and mnemonic for a host or location of the game machine, this would signal to and introduce or reinforce to a player or potential player that location of the machine, reminding them of the location. A sound identifier and mnemonic for a manufacturer of the game machine, this would signal to and introduce or reinforce to a player or potential player the manufacturer of the machine, reminding them of or signaling to them that a given machine was manufactured or produced by a certain manufacturer and if they had a positive experience with a certain manufacturers game machines, they may want to play this game machine if it is new or unfamiliar, or that they will be reminded that they are near one or more game machines of a specific manufacturer. Finally, a sound identifier and mnemonic for a theme of the game machine can be used, this would signal to and introduce or reinforce to a player or potential player the theme of the game machine, which may attract them to play by being influenced by the theme, topic of the game, or ascending musical notes.

The audio component in the form of musical notes that in specific fashion will be accompanied with colors that will also be part of the game play. The apparatus of the present invention will select and deliver the accompanying colors based on a Luscher type color test, which is one method of defining personality traits.

In an alternative embodiment, where a targeted demographic such as Boomers, millennials, Gen X'ers, or gender specific groups such as females over 50, the sound and light board outputs will be more slanted more to the interested or desires associated with the desired demographic that is the targeted customer.

In still another embodiment, the present invention can use artificial intelligence (AI) and facial recognition software and application in combination with the apparatus and process and method for delivering a specific visual, olfactory, and audible features providing a sensory immersion invoking a brand likeness. In this embodiment, facial recognition is used to make determinations of a player gender, either male or female. As a result of facial recognition detection and gender determination, the apparatus will then adjust the colors and music as pre-determined for an assigned gender. Colors and music selection will be determined and can be programmed based on gender characteristics and preferences, but in the event of a mistaken or incorrect detection, or when a detection is not possible, the selected color and music selection with not be biased or likely even noticeable to a player or spectator.

To enable gender selection using facial recognition software, a camera and backend software system enabling facial recognition and capable of gender identification would be incorporated into the machine's base or frame and directed to detect a person in front of or in the chair of the game machine. The facial recognition software system would take the graphical input and making a determination, after the determination is made, the facial recognition software system sends a signal input to the apparatus taught by the present invention. The apparatus selects from one of two codes, one for male and one for female, and then simply plays or executes the audio-visual presentation based on the facial recognition software system's signal.

All sounds will be in the middle of the bell curve and tailored to the demographics for the intended player where essentially, a speaker bell curve is created, with speakers or headphones with less bass on one end and devices with too much bass on the other. High quality audio monitors, which are balanced and neutral, are in the center of the curve and the sound board of the present invention will be programmed to deliver a sound in the middle of a typical sound bell curve.

Additionally, the sounds reel indexing will be in the middle of the sound bell curve as well.

FIG. 2 is an illustration of a slot machine guitar embodiment 200 with a first player chair 201 design taught by the present invention. In this embodiment the guitar 202 is the main attraction and the game play display is part of the guitar body 203. The chair 201 in this embodiment is slender, single occupancy design, which is fashionable and matches the silhouette of the guitar 202.

FIG. 3 is an illustration of one slot machine guitar embodiment 300 and a second player chair 301 design taught by the present invention. In this embodiment the guitar 302 is the main attraction and the game play display is part of the guitar body 303. The chair 301 in this embodiment is wider, single, or potentially double occupancy design, which is fashionable and matches the silhouette of the guitar 302. The chair 301 has an appearance that in combination with a lighting feature gives the appearance that it is floating.

In an exemplary embodiment, a guitar is used to exemplify one potential embodiment of the present invention with respect to the controller device 105 and what aspects of a gaming machine can be controlled. In practice, the controller device 105 can be attached to any game machine and is designed to be adaptable to any gaming machine or device in order to control and enable the delivery of a custom visual, light, and sound show with the addition of an olfactory experience, which evokes the name, image, likeness, and look and feel of a company or brand's identity to the game machine, in particular slot machines.

Although this embodiment has the physical shape of a guitar, the controller device 105 can be used to deliver the same functionality and visual and audio impression from any shaped gaming machine by simply adapting the sound and light controls to the gaming machine appearance, which is representative of a brand.

Additionally, the controller device 105 can be connected to one or more fans and scents that can be released and circulated around the location of the player through the air creating an aromatic feature that can be smelled by the player. This aromatic feature in combination with the audio and visual controls and presentation combine to deliver a complete sensory immersion to the player. The hardware and physical components of an olfactory system can be located in the base of the chair or in the game cabinet depending on machine design.

A wireless connection from the controller device 105 can communicate with a casino system to drive marketing for brand specific content with respect to the audio, visual, and olfactory display and providing a sensory immersion to a game machine which evokes the name, image, likeness, and look and feel of a company or brand's identity to the game machine, in line with current marketing requirements or directives.

The present invention is embodied and exemplified by a guitar embodiment, but it could be readily applied to many brand identities in the casino industry as well as the gaming industry.

FIGS. 8-9 illustrate the key features of an exemplary machines taught by the present invention. In this embodiment, a laser projector 801 behind the tuning knobs 802 on the guitar project string colors to the ceiling. The tuning knobs are standard candle colors. Arch and musical symbol molding 803 is used to reduce the severity of the door.

Strings 804 move with reel indexing between the visual and audio and the reels of the slot machine, while playing a musical beat and delivering a corresponding light show in an attraction mode.

The use of ascending musical notes is combined with that of the visual representation and light show creating the appearance of string movements in sync with and matching the musical audio show.

The ascending musical notes, and corresponding light show are used to index the audio and visual special effects in synchronization with the slot machine reels, which results in a light and audio experience where the light show creating the illusion that the musical instrument of the game machine is generating the music and delivering an audio and visual show or display that occurs in sync with the reels of the slot machine, in a similar manner to that of a visual display on a TV or other electronic device would index voice to video so that when a person is shown speaking on a TV, the audio of their voice matches and appears to come from their mouth.

Horizontal lights and frets 805 light up during a jackpot. The frets color lighting will be in the rhythm blinking with game sequence, in a manner where the lights and sound are indexed to a slot machines reels. Anticipation will be in the musical notes, ascending musical notes with six ascending sounds as a slots machine reels stop.

The guitar body is illuminated 806, and in this specific exemplary embodiment contains the logo of the casino 807, here the GUITAR HOTEL, which is iconically represented by a guitar.

The chair has embedded speakers 808 at the head and rope lights 809 are synchronized to door lights. A musical symbol 810 on the chair is also backlit and lights on pays.

The seating is designed to enrich the visual and has a sound baffle in the base to push the sound in three different directions downward to lessen the horizontal distance and push the sound through a specific area and upwards to allow the sound to carry far in the casino space.

The slot base houses sub woofers 811 that help drive a superior sound to the player.

Also the slot base houses the controller device 105 that drives the chair lighting and some of the peripherals. The slot base is a sound system that will work with the pulses sent from the controller device and will aim sounds in multiple directions as required by the operator.

Floor lighting 812 is also included under the sled and as the chair base.

The controller device 105 will receive data from a main office through radio frequency enabled by the R.F. Antenna 104 and has the ability to display on the screen of the machine marketing data or any other message that an operator wishes to display to its customers, i.e. club information and member rewards, etc.;

The controller device 105 also controls: multiple light functions in the chair, music to slot base, it turns on a ceiling projector, runs strings on guitar, pushes fret pulses during jackpot and does a whole sound and light show during top award. The controller device 105 suppresses game pulses and creates new effects that promote a house brand and not the game brand or theme. The controller device 105 enables each game to be programmed on demand and can be further defined to control the entire game or individual effects of one or more games from a dashboard, which enables the targeting of desired demographics on demand.

In practice, the controller device 105 receives pulses from the game106, 107, 108 and then the process and software of the controller device 105 that drives the wider array of sensory experiences crates new pulses 109, 110, 111 which create and effects that for controlling the timing and duration of an emission for an olfactory experience in combination with the audio and visual display providing a sensory immersion invoking a brand likeness.

Additionally, the controller device 105 will send data via the R.F. Antenna 104 or any wireless communication protocol to all inhouse audio visual devices that are interconnected through dedicated channels. This can be used to display light and sound shows that drive an entire visual effect which may be a custom display providing a sensory immersion invoking a brand likeness or custom light and sounds shows for holidays, events, or to memorialize a person.

In a jackpot mode, the wireless signal may be sent form the game machine and received by the marketing system to deliver a feed to every TV and display to deliver facility wide notifications where the entire location is delivering an audio, video, and olfactory sensory experience in harmony within microseconds in response to a jackpot being hit or other triggering event from any machine or as a result of a system wide event or a staged event, instantaneously or in sync.

The wireless communication access to the controller device 105 and corresponding game board, sound board, and light and lighting board and is not to be used for data collection, the wireless communication is only used for game play i.e. color and sound, etc.

In yet another embodiment, the method and processes taught by the present invention, which are described and illustrated as being applied to a physical game machine, can also be applied to a virtual or online game display or presentation. In this embodiment, the software coding and programming would replace the physical controller device taught used to implement the audio and visual sound and control functionality taught and applied to a physical game machine.

In practice, the controller device 105 can be attached to any game machine and is designed to be adaptable to any gaming machine or device in order to control and enable the delivery of a custom visual, light, and sound show with the addition of an olfactory experience, which evokes the name, image, likeness, and look and feel of a company or brand's identity to the game machine, in particular slot machines.

It is anticipated that regulatory testing of the device taught by the present invention is not needed as the device taught by the present invention does not interact with the gaming device in any way, there are no regulations regarding game attract devices, and the device taught by the present invention does not contain any code or operational functions that could impact normal game play.

In the marketplace there is a possibility of having an onsite inspection done to ensure proper installation of the device taught by the present invention and to ensure no bi-directional communications channels are accessed. Initial "approval" would therefor be limited to documentation attesting to the fact that the device taught by the present invention is not a regulated piece of gaming equipment and no regulatory approval letters are needed prior to install of the device taught by the present invention into existing gaming machines.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follow:

1. An apparatus for customizing one or more game machines with specific visual and audible features invoking a brand likeness, the apparatus comprising:

a controller device positioned in communication with processing system components of a game machine and output devices, wherein the controller device of the gaming machine includes a game board, a sound board, and a light and lighting board, to control game machine outputs, including signals processed by the game board, the sound board, and the light and lighting board;

the controller device receiving and reading inputs from the processing system components of the game machine including a user interface and transmitting corresponding control signals to a game board input of the game board that executes game logic and manages game play;

the controller device delivering a result of the inputs to a game machine display via a game board output;

the controller device sending the signals to a plurality of external devices synchronized to external visual and acoustic devices; and wireless communication access to the controller device and the game board, the sound board, and the light and lighting board wherein wireless communication is only used for the game play.

2. The apparatus of claim 1, wherein the controller device is positioned in a game machine base, a server room, an IDF closet or another secure area preferred by a casino operator;

input wires or other communication leads are connected to a wiring harness of the gaming machine to facilitate interaction with the processing system components of the game machine;

the controller device includes an SAS communications interface configured to monitor messages exchanged between the game machine and an SAS controller; and the controller device is configured to detect and respond to predefined game-related messages, including game play messages, jackpot messages, and reel spin messages.

3. The apparatus of claim 2, wherein the controller device is monitoring an SAS channel looking for the game play messages, the jackpot messages, and the reel spin messages; and when a targeted message is seen by the controller device, a pre-configured attract option is enabled illuminating one or more guitar strings, frets, external sound properties or other attract features.

4. The apparatus of claim 3, wherein the controller device controls and changes an entire visual color appearance of the game machine using the light and lighting board.

5. The apparatus of claim 4, wherein the controller device adds a themed attraction to the game machine; and all attract lighting and sounds are pre-configured in the controller device.

6. The apparatus of claim 5, wherein a color or sound package unique to individual game machines is selectable.

7. The apparatus of claim 6, wherein the controller device is linked to a particular bank or section of game machines so that the particular bank or section of game machines act in sync with each other when displaying attract themes.

8. The apparatus of claim 4, further comprising the step of creating sounds that are linked to indexing of slot machine reels; and using ascending musical notes for the indexing of the slot machine reels.

9. The apparatus of claim 8, wherein an audio component in a form of musical notes which in specific fashion embellish mnemonic sounds of a company identity.

10. The apparatus of claim 9, wherein the audio component is accompanied with colors that form part of the game play.

11. The apparatus of claim 9, wherein an attract mode includes an entire repertoire of audio and visual displays or programs; and one or more preprogrammed attract modes using ascending musical notes for reel indexing are selectable as an attract mode presentation.

12. The apparatus of claim 8, further comprising the steps of selecting desired colors based on a Luscher type color test; and delivering the selected colors based on the Luscher type color test.

13. The apparatus of claim 1, wherein one or more sound and light board outputs are tailored to one or more interests or desires associated with a demographic that is a targeted customer.

14. The apparatus of claim 1, wherein a body of the game machine is in a shape of a guitar; and the body is illuminated.

15. The apparatus of claim 14, wherein a chair in an embodiment is a single occupancy design.

16. The apparatus of claim 14, wherein a chair in an embodiment is a single or double occupancy design.

17. The apparatus of claim 14, wherein the plurality of external devices include:

a chair, a slot base, an enclosure of a slot machine, one or more guitar strings, one or more frets, one or more tuning devices, and a projector hidden in a neck of the guitar.

18. The apparatus of claim 14, wherein a chair has embedded speakers in a headrest and rope lights synchronized to door lights; and a musical symbol on the chair is also backlit and lights on pays.

19. The apparatus of claim 18, wherein the chair is configured to enrich a visual experience and has a sound baffle in a base to push a sound in three different directions downward to lessen a horizontal distance between a player and the embedded speakers and push the sound through a specific area and upwards to allow the sound to carry in a casino space; and A floor lighting is also included under a sled and as the base.

20. The apparatus of claim 14, wherein a slot base houses sub woofers that help deliver sound to a player;

the slot base houses the controller device that drives a chair lighting and some peripherals; and the slot base comprises a sound system that is configured to work with one or more pulses sent from the controller device and aims sounds in multiple directions as required by an operator.

21. The apparatus of claim 1, wherein the controller device controls:

running sound to a chair as well as lighting features including, multiple light functions in the chair, sending music to a slot base, turning on a ceiling projector, illuminating strings lighting features on a guitar, pushing fret pulses during a jackpot; and executing a whole sound and light show during a top award.

22. The apparatus of claim 1, wherein the controller device receives marketing data from a main office through radio frequency enabled by an R.F. Antenna and is configured to display on a screen of the game machine the marketing data or any other message that an operator wishes to display to its customers; and the controller device is configured to send the marketing data via a wireless connection to all in house audio visual devices that are interconnected through dedicated channels.

23. The apparatus of claim 1, wherein a game specific mnemonic is used to identify a host or location of the one or more game machines, including a casino, an arcade, or another branded location.

24. The apparatus of claim 1, further comprising artificial intelligence (AI) and facial recognition software in combination with the controller device;

wherein, facial recognition is used to make determinations of a player gender, either male or female;

as a result of facial recognition detection and gender determination, the controller device then adjusts theme colors and music as pre-determined for an assigned gender.

25. The apparatus of claim 24, further comprising a camera and backend software system enabling the facial recognition and capable of the gender determination incorporated into a base or frame of the game machine and directed to detect a person in front of or in a chair of the game machine;

a facial recognition software system taking a graphical input and making the gender determination;

after the gender determination is made, the facial recognition software system sends a facial recognition signal to the controller device;

the facial recognition signal comprises either a first code or a second code the first code for male and the second code for female; and executing a audio-visual presentation based on the facial recognition signal.

\* \* \* \* \*